United States Patent

[11] 3,567,936

[72] Inventor Jay Tittman
Danbury, Conn.
[21] Appl. No. 703,679
[22] Filed Feb. 7, 1968
[45] Patented Mar. 2, 1971
[73] Assignee Schlumberger Technology Corporation
New York, N.Y.

[54] MULTIPLE NEUTRON DECTOR BOREHOLE LOGGING TOOL
1 Claim, 4 Drawing Figs.

[52] U.S. Cl. ................................................. 250/83.1,
250/71.5, 250/83.3, 250/83.6
[51] Int. Cl. ....................................................... G01t 1/16,
G01v 5/00
[50] Field of Search ........................................... 250/71.5,
83.6 (W), 83.3, 83.1

[56] References Cited
UNITED STATES PATENTS

| | | | | |
|---|---|---|---|---|
| 3,462,600 | 8/1969 | Dewan | | 250/83.6WX |
| 2,469,462 | 5/1949 | Russell | | 250/83.6W |
| 2,776,378 | 1/1957 | Youmans | | 250/83.6W |
| 3,240,938 | 3/1966 | Hall, Jr. | | 250/83.6W |
| 3,413,466 | 11/1968 | Allen, Jr. | | 250/71.5 |
| 3,435,217 | 3/1969 | Givens | | 250/83.6W |

*Primary Examiner*—William F. Lindquist
*Assistant Examiner*—Morton J. Frome
*Attorneys*—William R. Sherman, Richard E. Bee, Donald H. Fidler, Stewart F. Moore and John P. Sinnott ABSTRACT: An earth formation porosity logging tool in accordance with an illustrative embodiment of the invention comprises a neutron source and four neutron detectors spaced at different distances from the source for transport through a borehole. Signals are obtained that correspond to the ratios of the counts registered by the two short-spaced detectors and the two long-spaced detectors. The effect of the borehole characteristics on the formation porosity measurement is compensated by directly contrasting these ratio signals with each other. A second illustrative embodiment of the invention using only three neutron detectors also is shown and described.

MULTIPLE NEUTRON DECTOR BOREHOLE LOGGING TOOL

BACKGROUND OF THE INVENTION

1. Field of the Invention

This invention relates to borehole logging methods and apparatus and, more particularly, to an improved technique for measuring porosity by observing the behavior of neutrons within an earth formation, and the like.

2. Description of the Prior Art

In the prior art, proposals were advanced to measure the neutron diffusion and absorption characteristics of earth formations in order to determine formation hydrogen content. Hydrogen, which is generally most abundant in the pore fluids, often identifies those formations that are likely to produce economically significant quantities of oil.

One of these earlier proposals suggests a tool that comprises a housing that contained a neutron-emitting source. Two radiation detectors within the housing were spaced at different distances from the source. These detectors produced signals that corresponded to the profile or vertical spatial distribution of the emitted neutrons within the formation and the borehole. In effect, the two detectors sampled the neutron population at two points spaced from the source. These two points identified the rate of decline in the neutron population as a function of distance from the source. This decline rate, or the slope of the neutron distribution in an earth formation, was believed to be related uniquely to the hydrogen content of the formation under study.

This suggestion, however sound in theory, has failed to satisfy the need for a tool with a practical source-detector spacing for several reasons. Primarily, the ratio of the detector signals varies in response to changes in the borehole conditions as well as to changes in the formation porosity. For example, a change in the ratio of the detector signals may indicate an increase in the borehole diameter or an increase in the earth formation porosity. Accordingly, these proposed tools produce ambiguous results because variations in the ratio of the detector signals alone fail to disclose the physical reason that caused the observed change.

These borehole influences decline with increasing source-to-detector spacings. If the separations are increased to reduce the borehole effect to insignificance, however, the count rates from the detectors decline to a level of statistical unreliability. The prior art failed to resolve this dilemma. Thus, a requirement exists for a reliable neutron logging tool that is relatively unresponsive to borehole conditions.

Therefore, it is an object of the invention to provide an improved formation porosity logging tool.

It is a further object of the invention to measure the neutron diffusion characteristics of an earth formation in the presence of a changing borehole environment with greater accuracy than heretofore possible.

It is still a further object of the invention to provide a means for directly contrasting short-spaced and long-spaced neutron detector signal ratios to indicate directly the porosity of an earth formation.

It is still another object of the invention to provide an improved multiple neutron detector logging tool.

SUMMARY

Ordinarily, neutrons emitted from a tool within a borehole establish a spatial distribution that is characterized approximately by the expression:

$$Ce^{-x/L} \quad (1)$$

where $e$ is the base of the system of natural logarithms; $x$ is distance from the neutron source; $C$ is a proportionality factor; and $L$ is the relaxation length which describes the rate at which the neutron flux falls off in the foregoing representation of the neutron distribution. In a practical logging situation the vertical neutron distribution is determined not by a single value of L, but by one value that largely reflects the borehole features, $L_{borehole}$, and a different relaxation length, $L_{formation}$, that represents the characteristics of the earth formation. Close to the neutron source the borehole relaxation length exerts a dominant influence on the neutron distribution. At greater distances from the source, depending on the composition of the formation and the condition of the borehole, the neutron distribution is more clearly measured in terms of the formation relaxation length.

One proposal to overcome the adverse influence of the borehole environment has been directed to the observation and interpretation of the relaxation length as a function of the neutron distribution in the immediate vicinity of the neutron source. The relaxation length close to the source ordinarily is measured by observing the signals from two neutron detectors spaced close to, but at different distances from the source. These signals are dominated by the relaxation length characterizing the borehole environment. The two far-spaced detectors, hereinbefore mentioned in connection with the prior art, have a greater depth of investigation and consequently their signals are more nearly indicative of the relaxation length characterizing the earth formation.

By combining these four signals according to a precisely specified mathematical relationship, the relaxation length of the neutrons within the formation is identified. The formation relaxation length then can be interpreted in terms of the earth formation porosity. This specific technique is described in more complete detail in the patent application of Walter A. Nagel titled "Measuring Apparatus and Method," which was filed at the same time as the instant application for patent now U.S. Pat. application Ser. No. 703,678.

Measurement of the relaxation length provides a reasonably accurate description of the neutron distribution in the borehole and earth formation environments. Relaxation length data, however, is not of direct interest to the petroleum engineer or geologist seeking to interpret potential oil production in terms of earth formation porosity. Consequently, from the viewpoint of field operations, neutron relaxation length measurements represent an additional step in the earth formation porosity determination.

In accordance with the invention, it was recognized that the porosity of the earth formation surrounding a borehole can be measured through a direct interpretation of two neutron detector signal ratios without the need first to compute the formation relaxation length.

More particularly, a ratio is struck between the signals provided by two primary slow neutron detectors within a logging tool. The detectors are spaced at sufficient, but different, distances from a neutron source to respond principally to those neutrons that have penetrated the formation to a great enough depth to be representative of the earth formation porosity.

Two additional neutron detectors within the housing are placed at different distances closer to the neutron source than the primary pair of neutron detectors. The additional neutron detection equipment spacing is so short relative to the neutron source that the signals produced generally reflect the borehole conditions. The short-spaced detection equipment signals are used to produce a secondary signal ratio that is combined with the primary ratio to compensate for the influence of the borehole.

Specific details of an illustrative device for producing the far detector signal ratio is described in application Ser. No. 570,068 filed Aug. 3, 1966, for "Measuring Apparatus and Method" by Stanley Locke, Harold Sherman and John S. Wahl and assigned to the same assignee as the invention described herein now U.S. Pat. No. 3,483,376.

In an exemplary embodiment of the invention, the second pair of neutron detectors are spaced within the housing at different distances from the source that are, moreover, less than the separation between the source and the aforementioned pair of formation responsive neutron detectors. Appropriate electrical circuits are provided to contrast the ratio signals directly in accordance with a predetermined empirical relation without an intermediate neutron relaxation length determination, in order to identify the formation porosity in spite of changes in the borehole size, and the like.

In practicing the invention, it is preferable for the near-spaced and far-spaced neutron detectors to respond to slow neutrons, that is, neutrons that have average kinetic energies which are approximately the same as the constituents of the medium through which they are diffusing.

An alternative embodiment of the invention combines the signals from three neutron detectors, each spaced a different distance from the neutron source. The short- and long-spaced detectors provide a first signal ratio and the intermediate- and long-spaced detector signals establish a second signal ratio. These ratios are combined in the aforementioned manner to produce an accurate indication of the formation porosity.

For a better understanding of the present invention, together with other and further objects thereof, reference is had to the following description taken in connection with the accompanying drawings, the scope of the invention being pointed out in the appended claims.

DESCRIPTION OF THE PREFERRED EMBODIMENTS

Figure 1:
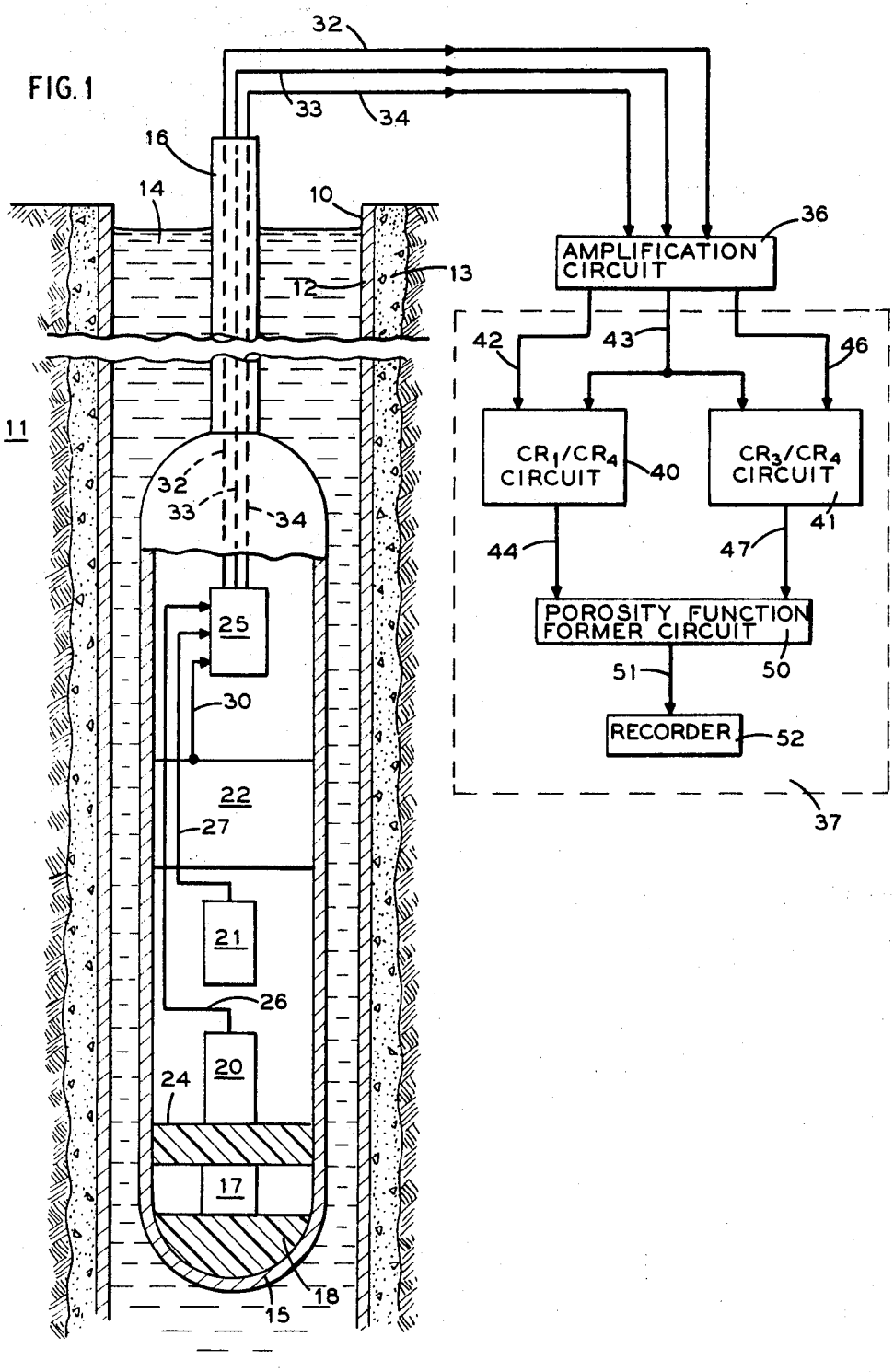
FIG. 1 is a schematic diagram of a borehole logging tool in partial section according to one embodiment of the invention, showing the electrical circuits associated therewith in block diagram form.

A typical embodiment of the invention is shown in FIG. 1.

A borehole 10 formed in an earth formation 11 may be open (not shown) or cased with one or more strings of steel pipe 112 to prevent the borehole wall from caving in. An irregular annulus of cement 13, moreover, is set between the formation 11 and the pipe 12 ro hold the pipe in place and prevent vertical fluid communication between the different formations traversed by the borehole 10. The borehole may be filled with gas, air or borehole liquids 14, as shown.

A logging tool in accordance with the invention comprises a pressure resistant housing 15 of steel or the like, which is suspended from a multiconductor armored cable 16 in order to be lowered into and withdrawn from the borehole during logging operations. A winch (not shown) located on the surface of the earth is used to lower and raise the apparatus in the borehole in the customary manner to traverse the earth formation 11.

Depending on the physical environment of the borehole, the presence of liquids 14 and the character of the earth formation 11, the pressure housing 15 may be suspended freely within the borehole 10 as shown, centered within the borehole by means of bowsprings or the like (not shown) or pressed against one side of the borehole 10 to provide a "sidewall" tool (also not shown A neutron source 17 is positioned within the lowermost end of the pressure housing 15. Although the neutron source 17 may be an electrically operated neutron generator, it is preferable to use a "chemical " source, for example, a mixture of plutonium and beryllium or americium and beryllium that continuously emits neutrons as a result of nuclear processes occurring between the constituent source materials. It has been found that a chemical source of about 5 curies strength, or more, is satisfactory for the purposes of the invention.

The neutron source 17 is supported in the housing 15 by a mass of scattering material 18 formed, for example, of steel, copper, hevimet, or some appropriate combination of materials of this sort.

Neutrons emitted from the chemical source 17 have an average initial energy of several million electron volts (Mev.). Many of these neutrons penetrate the fluid 14, the pipe 12, the cement annulus 13 and diffuse through the formation 11. The diffusing neutrons collide with the nuclei in the borehole and formation materials. These collisions produce different results according to the energy of the colliding neutron and the nature of the individual nucleus under consideration. From the viewpoint of the invention, only two types of collision are of interest. First, the initial high energy neutrons collide with nuclei and transfer some energy to each nucleus so struck. In this manner the neutrons lose energy until their average kinetic energy is in equilibrium with the medium through which they are diffusing. Hydrogen, a major constituent of the borehole fluid 14 and the cement 13, absorbs disproportionately more energy from the irradiating neutrons through this process than elements of higher atomic number as, for example, calcium and other common earth formation constituents. Thus, slow neutrons, especially those in the immediate vicinity of the source 17, are more indicative of the hydrogen content of the borehole environment than they are of the formation characteristics.

Figure 2:
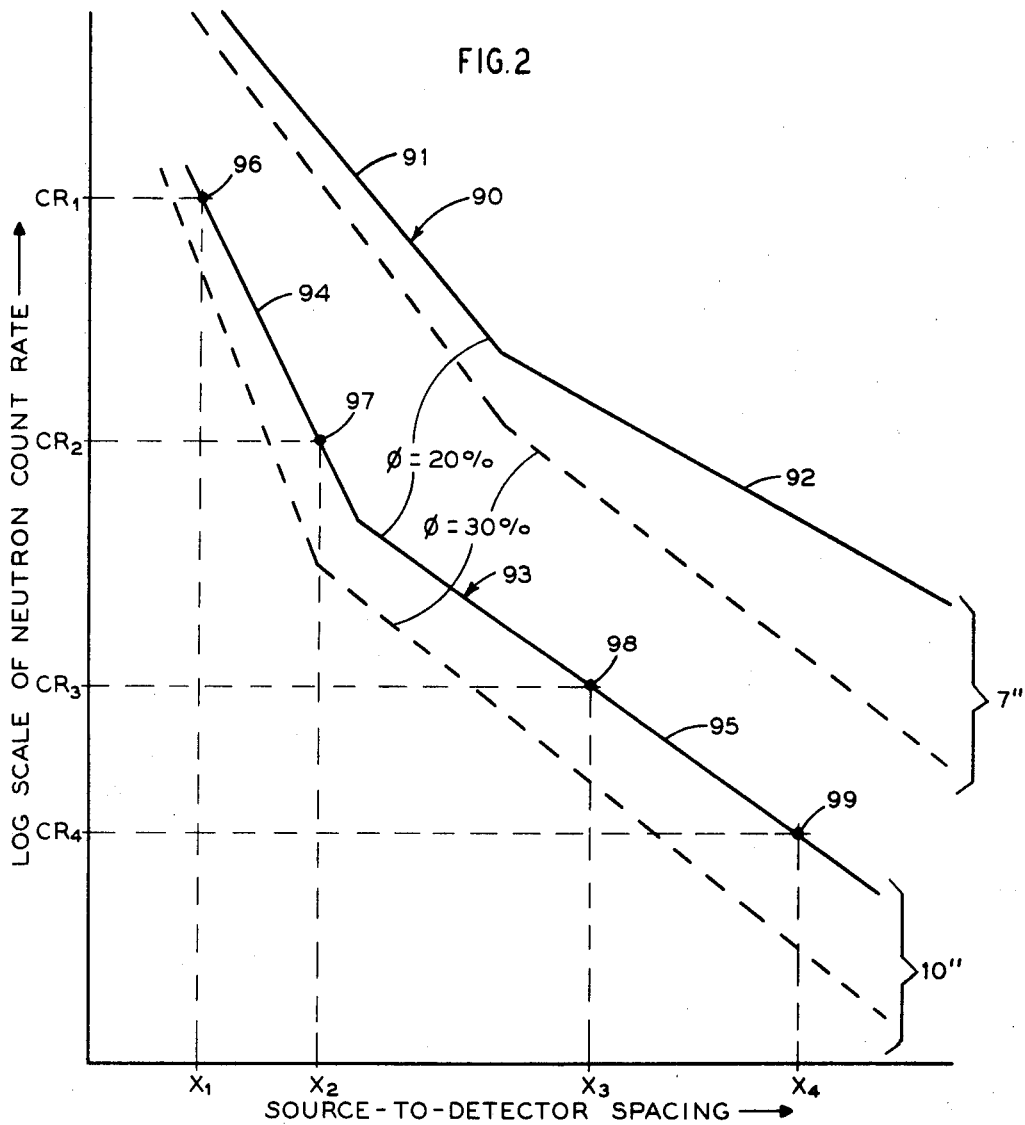
FIG. 2 is a semilogarithmic graph of neutron density as a function of source-to-detector spacing in which some of the features have been exaggerated to illustrate more clearly neutron distributions within boreholes in earth formation environments.

The second interaction is absorption, in which the colliding neutron is captured by the nucleus. Reactions of this sort occur most frequently among thermal neutrons, and always result in the removal of the colliding neutrons from the neutron population. Consequently, elastic collisions largely are responsible for the diffusion of the irradiating neutrons through the formation 11. This general diffusion away from the source 17 also produces a more or less exponential decline in the neutron density with increasing separation from the source as shown in FIG. 2. Neutron capture also contributes to this decline in the neutron population in a complicated relation that depends, in part, on the relative abundance of the different elements present in the formation and the borehole.

As hereinbefore mentioned, the slope of the neutron distribution as observed within the borehole reflects the relaxation length of the neutrons within the formation and the neutron relaxation length in the borehole. FIG. 2 shows those portions of the neutron spatial distribution that are dominated by the respective parameters. Features of the curves shown in this FIG. have been exaggerated to emphasize the relaxation length influences for illustrative purposes. For example, the change in neutron distribution with separation from the neutron source as registered in a 7-inch diameter cased borehole traversing a 20 percent porous earth formation is shown by a curve 90. The curve 90 is comprised of a steeper sloping portion 91 in the vicinity of the neutron source and a more gradually declining portion 92 spaced outwardly from the source. In practice, the transition between the portions 91 and 92 of the curve 90 are not so abrupt as shown in FIG. 2. The portions in fact blend into each other to provide a generally upward concavity in the region of their intersection.

Thus, a curve 93 characterizing a 10-inch diameter uncased borehole in a 20 percent porous formation is comprised of a portion 94 in the vicinity of the neutron source, and a portion 95 that becomes dominant at a greater distance from the source. The slope of the portion 94 typically may be approximated through a "short-spaced ratio" of the neutron count rate $CR_1$ to the count rate $CR_2$ identified by points 96 and 97, respectively. Similarly, neutron count rates $CR_3$ and $CR_4$, identified by points 98 and 99, are combined to establish a "far-spaced ratio" of the signals $CR_3$ to $CR_4$ in order to describe the slope of the curve portion 95.

Figure 3:
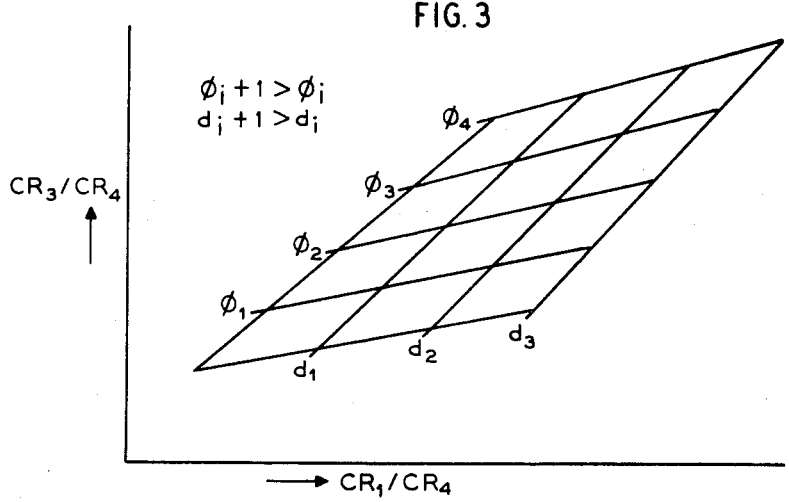
FIG. 3 is an exemplary graph in accordance with the invention that shows the direct relation between the detector signal ratios and the porosity of the earth formation.

As a further approximation, the neutron count rate signal $CR_2$ may be omitted, and thereby reduce the complexity of the logging system under consideration. Accordingly, in this latter embodiment of the invention, a first ratio of the signals $CR_1$ to $CR_4$ and a second ratio of the signals $CR_3$ to $CR_4$ are contrasted with each other to produce, as shown in FIG. 3, a more accurate indication of the earth formation porosity, $\Phi$, than that which has characterized the prior art. Thus, for specific entering arguments $CR_3/CR_4$ and $CR_1/CR_4$, an accurate value of the formation porosity, $\Phi$, is determined uniquely, in spite of changes in the borehole diameter.

To simplify the computation, ratios of detector counts may be taken as described in the aforementioned Locke et al. patent application, rather than the time-dependent ratios of count rates as described above.

To accomplish this purpose in accordance with the invention, FIG. 1 shows three neutron detectors 20, 21 and 22 positioned within the housing 15 each at different axial distances from the source 17. Typical spacings between the effective centers of the detectors 20, 21 and 22, as measured from the effective center of the neutron source 17, are respectively 4", 16" and 25". The actual spacings between these detector centers are, of course, flexible, and the spacings suggested herein are only representative values. Specifically, the detector 20 should be positioned between the intersection of the curve portions 94 and 95 and the point where projections of the extensions of the curves 90 and 93 cross (not shown).

A neutron scattering and deflecting shield 24 of copper, hevimet or the like, or an appropriate combination of these materials, is interposed between the source 17 and the detectors. The detectors 20 through 22 measure the porosity of the formation 11 and compensate this measured porosity for the effect of changes in the borehole environment as reflected in the neutron population in the immediate vicinity of the detector 20 which is located closest to the source 17.

Preferably, the detectors 20 through 22 are helium 3 ($He^3$) counting tubes that produce a charge pulse or a "count" in response to each incident slow neutron. Alternatively, the neutron detectors 20 through 22 may respond to gamma radiation emitted as a consequence of slow neutron interactions with the borehole and formation constituents. Typically, an $He^3$ detector tube comprises a hollow cylindrical cathode surrounding a centrally disposed anode wire (not shown). The volume between these electrodes is filled with gaseous $He^3$ at a pressure of about four or more atmospheres. The neutrons collide with the $He^3$ atoms in the gas and initiate nuclear reactions. Each reaction causes some filling gas ionization which produces an electrical charge pulse in the electrodes that is representative of the reaction energy. Detector tube 21, for example, may be 7¼ inches in length and 1¾ inches in diameter such that the transverse area of the detector tube 21 is substantially less than the corresponding transverse area of the housing 15. Of course, the size and gas pressure of the counters increase as the separation between the source and detectors increase.

The neutron detector tube 22 in the embodiment of the invention shown in FIG. 1 preferably has a length of 9¼ inches and a diameter of 2¾ inches. The diameter of the tube 22 is substantially coextensive with the corresponding diameter of the housing 15 to enable the tube 22 to be as large as the physical limitations of the housing 10 will permit. The large active volume of the tube 22 accommodates the maximum amount of $He^3$ gas attainable within the constraints imposed by a reasonable housing diameter in order to provide the best possible neutron sensitivity.

As described in more complete detail in the aforementioned Locke et al. patent application, a ratio of the neutron counts registered by the two long-spaced detectors 21 and 22 ordinarily produces an indication of the formation porosity when the borehole diameter and casing thickness are known with reasonable accuracy. In a practical well logging situation, however, the first of these factors frequently is not known or cannot even be estimated with reliability. For example, caving in the wall of the borehole 10 behind the steel pipe 12, and the thickness of the cement annulus 13 filling the void space thus formed cannot be determined readily. The casing, moreover, may not be centered within the cement, and therefore the thickness may vary with azimuth.

One aspect of the invention enables the signal from the neutron detector 20 to be manipulated in order to correct the apparent porosity of the formation 11 registered by the detectors 21 and 22 for the effect of borehole size and cement thickness. It will be recalled that the neutron detector 20 is spaced close to the neutron source 17 and responds primarily to the borehole environment.

Turning once more to the exemplary physical structure shown in FIG. 1, signals from the neutron detectors 20 through 22 are sent to a downhole signal transmission circuit 25 through conductors 26, 27 and 30, respectively. The neutrons registered in each of these detectors produce individual accumulations of counts that preferably are amplified and scaled by an appropriate factor in the downhole transmission circuit 25. These processed signals then are sent to the earth's surface through respective conductors 32, 33 and 34 in the armored cable 16.

At the earth's surface the signals in the conductors 32 through 34 are individually amplified in an amplification circuit 36. The circuit 36, moreover, may contain pulse height discriminators to distinguish the signal from noise and further scaling circuits to simplify the data handling problem in a porosity computation circuit 37.

The porosity computation circuit 37 comprises a pair of ratio circuits 40 and 41. The ratio circuits 40 and 41, for example, are of the type described in more complete detail in the aforementioned Locke et al. patent application. Ratio circuit 40 is coupled to the output of the amplification circuit 36 through conductors 42 and 43 in order to establish a signal that corresponds to the first ratio, $CR_1/CR_4$, which is composed of the outputs from the neutron detectors 20 and 22. A signal that corresponds to this first ratio is applied by the circuit 40 to an output conductor 44.

In a similar manner the $CR_3/CR_4$ ratio circuit 41 responds to output signals from the amplification circuit 36 in the conductor 43 and a conductor 46 that correspond to the signals from the neutron detectors 21 and 22, respectively. The output from the ratio circuit 41 is a quotient that comprises the neutron activity observed by the detector 21 and the neutron activity registered by the most distantly spaced neutron detector 22. This ratio signal is coupled to an output conductor 47.

The ratio signals in the conductors 44 and 47 are applied to a porosity function former circuit 50. The function former circuit 50 converts the two ratio signals in the conductors 44 and 47 into a signal that corresponds to the formation porosity, $\Phi$, and another one that corresponds to borehole diameter, $d$, in accordance with empirically derived data as shown, for example, in FIG. 3.

Typically, the function former circuit 50 takes the form of an operational amplifier having a resistor-diode network connected in the amplifier feedback circuit. The circuit parameters and biasing of the function former circuit are chosen to establish an operating response characteristic that corresponds to the features of the graph shown in FIG. 3.

Depending on the mineral composition of an earth formation under consideration, for example, limestone, sandstone or a mixture of limestone and sandstone, individual function former circuits can be selectively connected to the ratio circuit output conductors to establish the responses characterizing these different mineral structures. The data needed to establish the values of the electrical components in these function former circuits can be developed from trials in test formations of known porosity and mineral composition. This data is organized initially into a comprehensive series of graphs similar to FIG. 3. The function former circuits then are arranged to produce responses that approximate respective formation characteristics as represented by each graphical relation.

Thus, as the housing 15 is drawn upward through the borehole 10 and the composition of the earth formation 11 changes, the appropriate porosity function former circuits commensurate with the new formation mineral composition can be connected manually, if desired, to the ratio circuit output conductors 44 and 47.

The signal from the porosity function former circuit 50 is applied through a conductor 51 to a recorder 52 in order to make a graph of formation porosity in terms of borehole depth.

Figure 4:
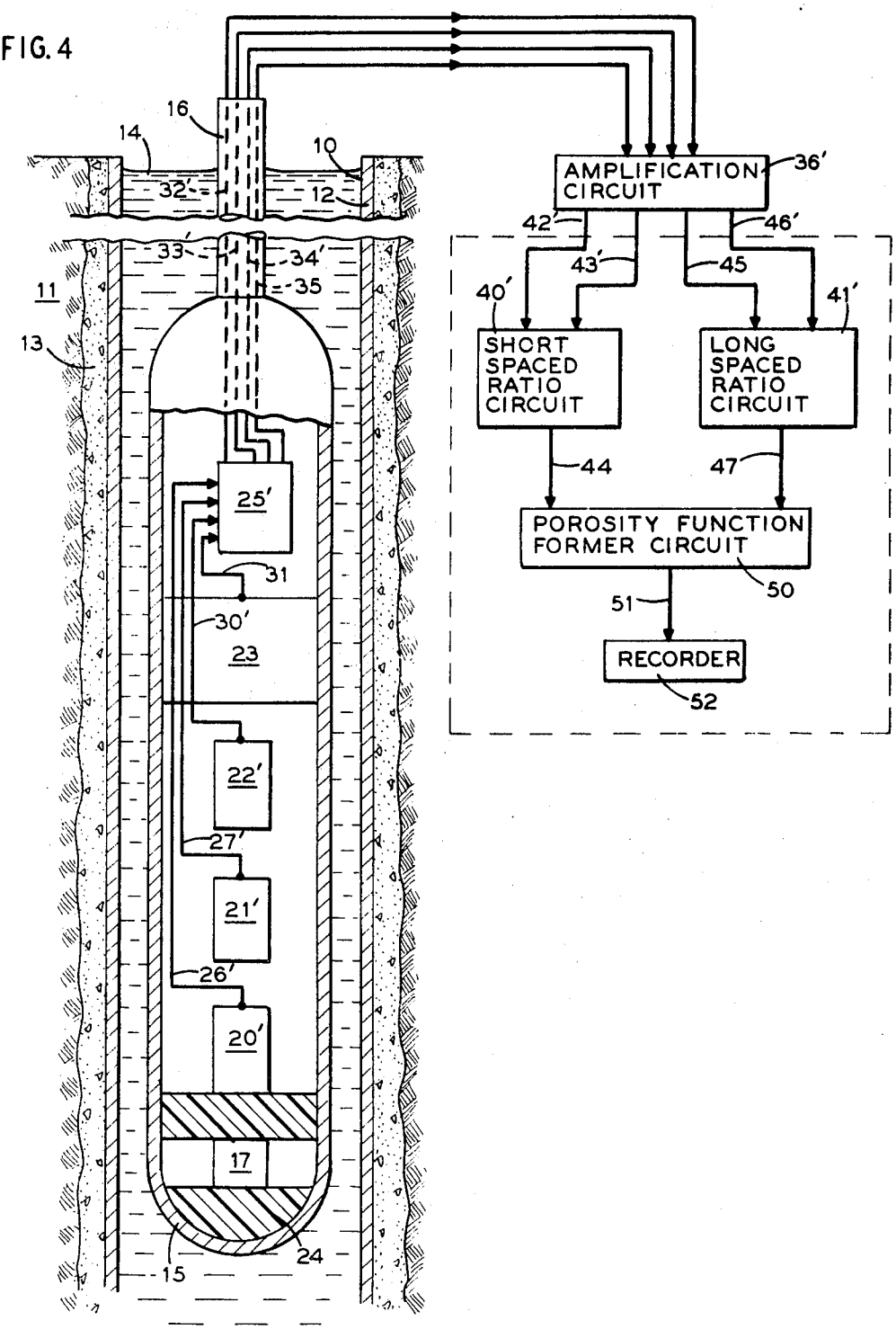
FIG. 4 is a schematic diagram of another embodiment of the invention.

An alternative embodiment of the invention is shown in FIG. 4. Four neutron detectors 20', 21', 22' and 23, which preferably are of the type described in connection with the embodiment of the invention shown in FIG. 1, are separated from the neutron source 17 each by different distances. The furthest spaced detector 23, the effective center of which is preferably about 25 inches from the effective center of the source 17, has transverse dimensions that are substantially coextensive with the interior of the housing 15 as hereinbefore described in connection with the detector 22 in FIG. 1.

Signals from the detectors 20' through 23 are sent to a downhole transmission circuit 25' through conductors 26', 27', 30' and 31, respectively. The transmission circuit 25' processes the neutron detector signals for transmission to the earth's surface through conductors 32', 33', 34' and 35 in the armored cable 16.

The neutron detector signals are applied to an amplification circuit 36'. The output from the amplification circuit 36' is applied to short- and long-spaced ratio computation circuits 40' and 41', respectively, through conductors 42', 43', 45 and 46'.

The signals from the shortest-spaced detectors 20' and 21' are combined in a ratio of $CR_1$ to $CR_2$ (FIG. 1) in the short-spaced ratio circuit 40' to establish an output signal in the conductor 44. The signal from the furthest-spaced detectors 22' and 23 are combined in the long-spaced ratio circuit 41'. The output from the circuit 41' is coupled to the conductor 47 and corresponds to the detector signal ratio $CR_3/CR_4$ (FIG. 1). These ratio signals are combined subsequently in the manner hereinbefore described in more complete detail in connection with FIGS. 1 and 3 to produce a signal in the conductor 51 that is registered by the recorder 52 as a graph of formation porosity in terms of the borehole depth.

It will be recalled that in some logging conditions it is preferable to eccentrically position the housing shown in FIGS. 1 and 4 to enable the tool to ride against the borehole wall. In this circumstance it may be advantageous to collimate the neutron beam from the source 17 and eccentrically mount at least some of the detectors so that they are adjacent to the portion of the housing 15 that is tangent to the borehole wall.

The neutron detectors in the embodiments of the invention shown in FIGS. 1 and 4 are positioned at different distances vertically above the neutron source 17. Alternatively, the neutron source 17 may be straddled by a pair or pairs of the detectors. A configuration of this latter character prevents the arrangement of detectors, shown in the drawing, from masking or absorbing a significant portion of the neutron population that ought to be registered by each of the successively longer-spaced detectors. The volume within the housing between the source and the straddling detectors, moreover, can be filled with a neutron thermalizing or moderating material as described in more complete detail in U.S. Pat. application Ser. No. 663,596 filed Aug. 28, 1967 for "Logging Technique" by Walter A. Nagel and assigned to the same assignee as the invention described herein.

Turning once more to the embodiment of the invention shown in FIG. 1, it may be advantageous, depending on the tool configuration, the borehole condition and other parameters, to distinguish the porosity of the formation in terms of the ratios $CR_3/CR_4$ and $CR_1/CR_3$.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:

1. A tool for measuring the porosity of an earth formation comprising a housing, one source of neutrons within said housing for irradiating the earth formation, a short-spaced neutron detector within said housing spaced from said one neutron source in the vicinity of about 16 inches to produce a signal that corresponds to the neutron distribution in the earth formation in response to neutrons from said one source, a long-spaced neutron detector within said housing spaced from said one neutron source in the vicinity of about 25 inches to produce a signal that corresponds to the neutron distribution in the earth formation in response to neutrons from said one source, neutron detecting apparatus within said housing spaced from said one neutron source a distance of less than about 16 inches to produce a signal that corresponds to the neutron distribution in the earth formation in response to neutrons from said one source, signal transmission means within said housing for processing said detector signals and said apparatus signal for transmission to the earth's surface, amplification means on the earth's surface for amplifying said processed signals, a first ratio circuit coupled to said amplification means for producing a signal that corresponds to the ratio between said long-spaced detector signal and said neutron detecting apparatus signal, a second ratio circuit coupled to said amplification means for producing a signal that corresponds to the ratio between said short-spaced detector signal and said neutron detecting apparatus signal, a function former circuit for combining said ratio signals in accordance with a preestablished response characteristic that produces an output signal that corresponds to the earth formation porosity, and a recorder for establishing a log of said porosity signal.